UNITED STATES PATENT OFFICE.

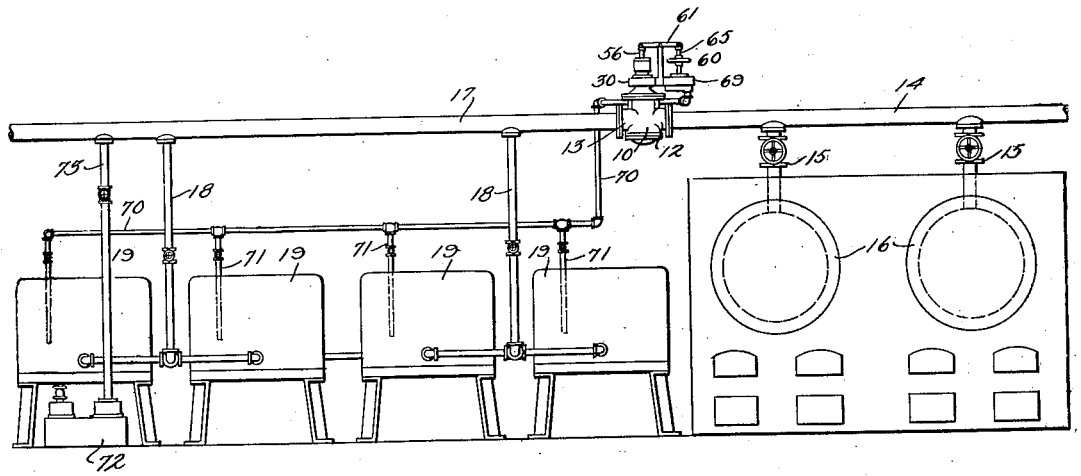
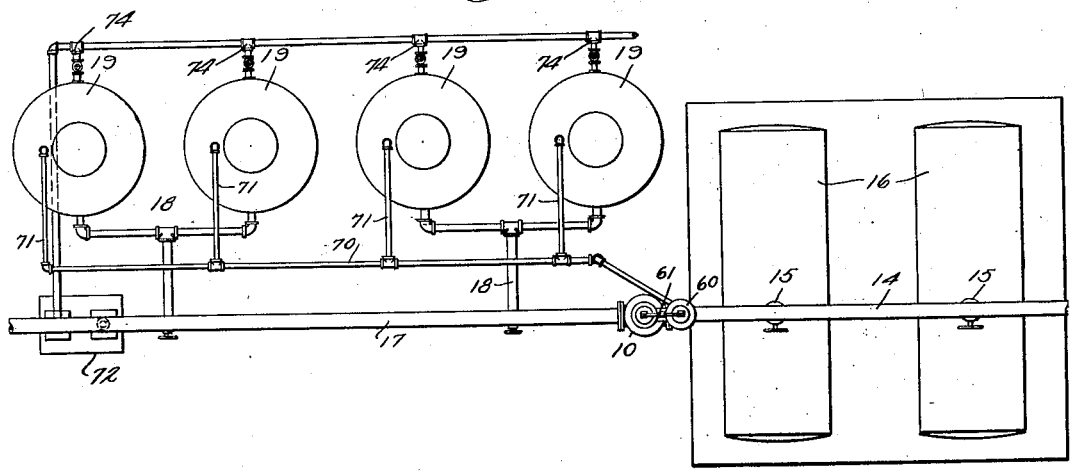

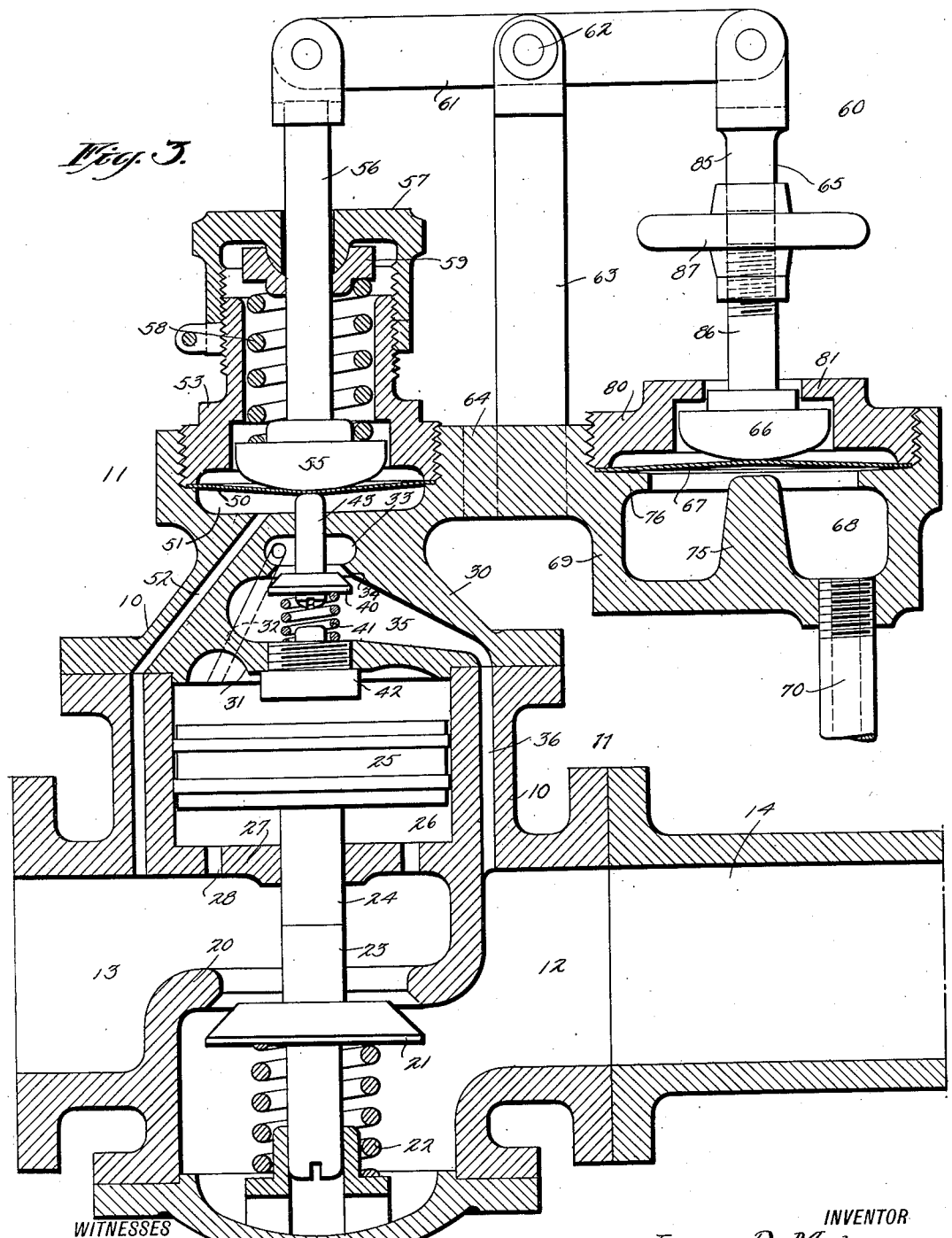

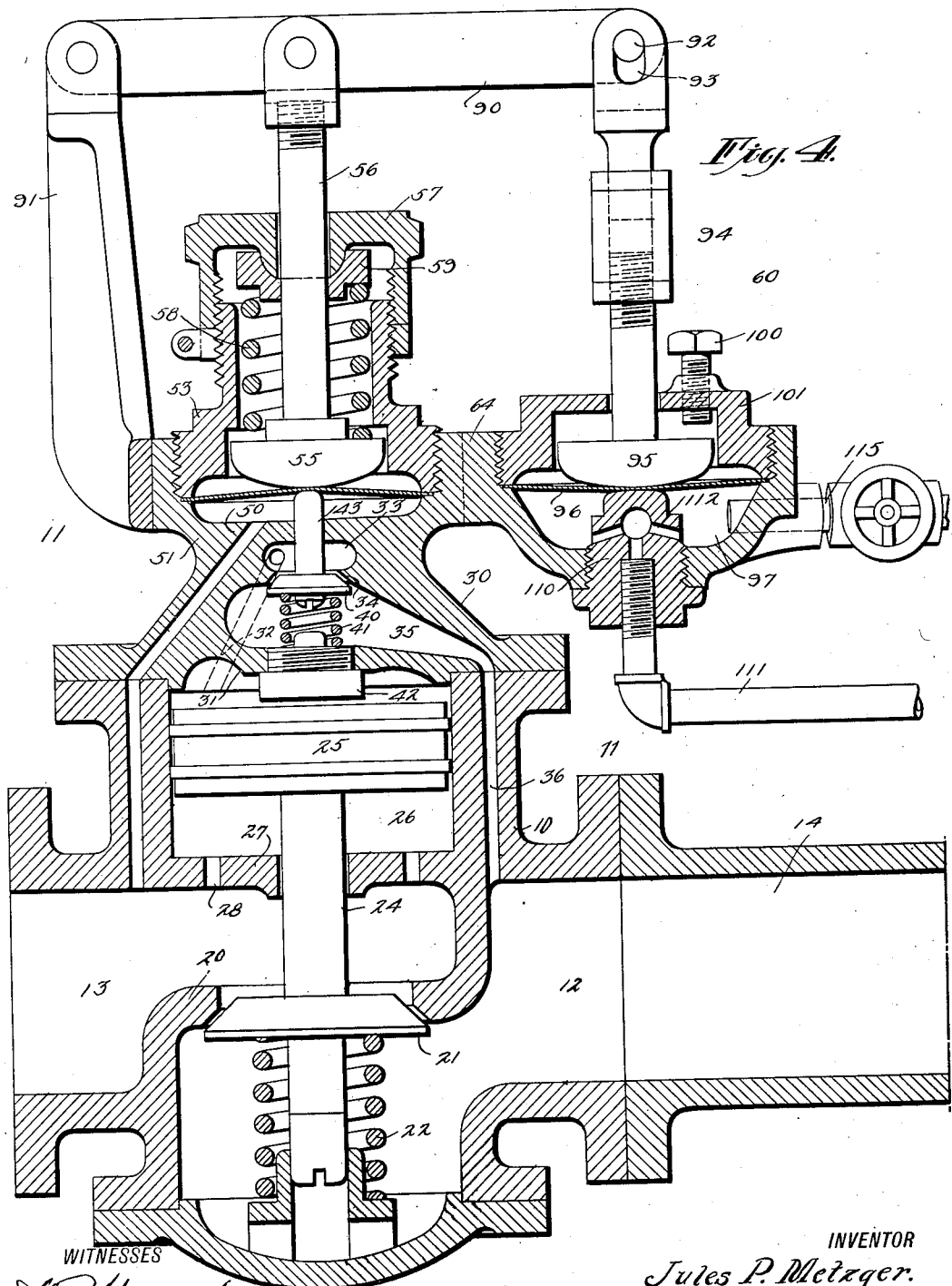

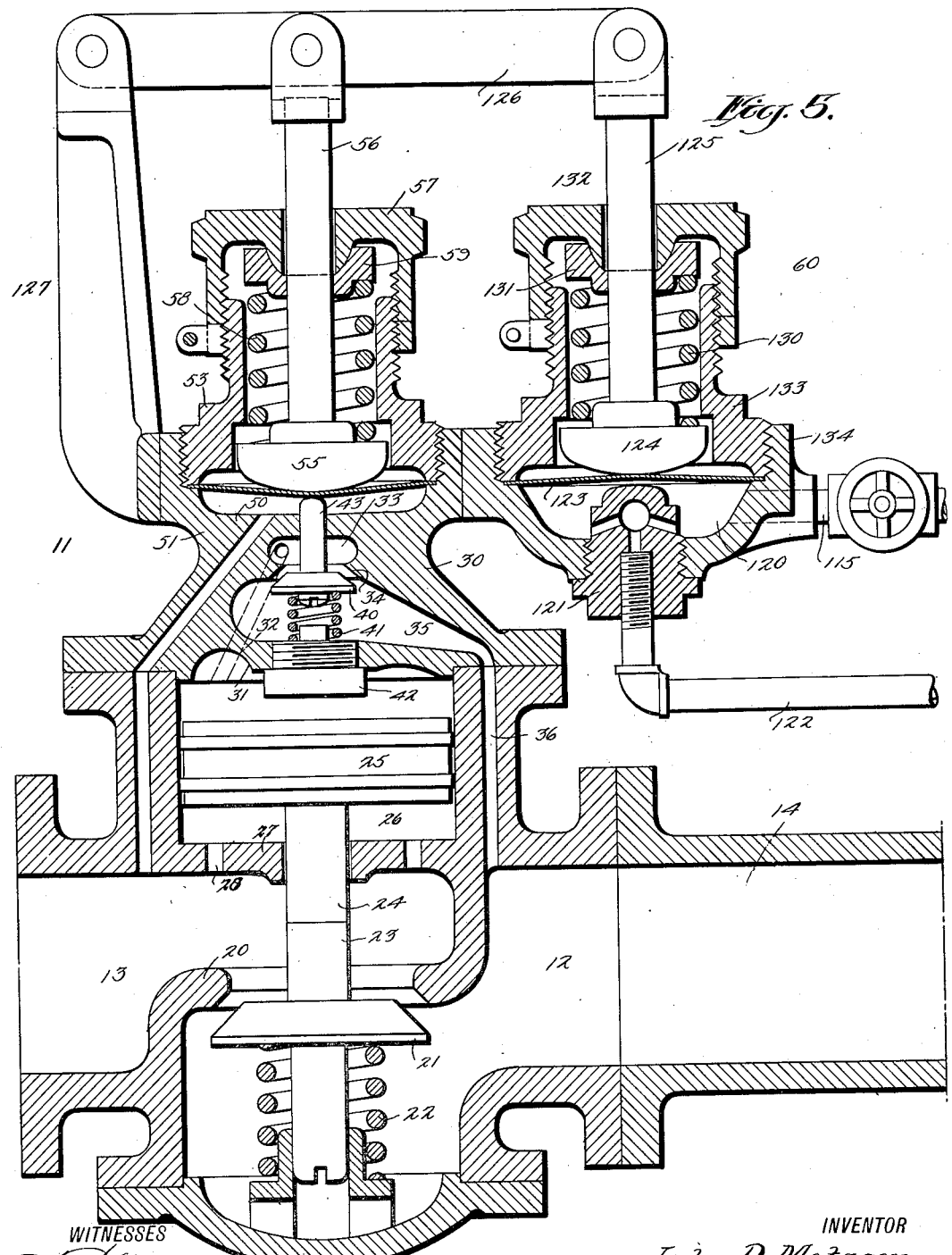

JULES P. METZGER, OF CARLSTADT, NEW JERSEY, ASSIGNOR TO THE LESLIE CO., OF LYNDHURST, NEW JERSEY, A CORPORATION OF NEW JERSEY.

COMBINED PRESSURE REGULATING AND GOVERNING APPARATUS.

1,369,690.  Specification of Letters Patent.  Patented Feb. 22, 1921.

Application filed January 14, 1920. Serial No. 351,352.

*To all whom it may concern:*

Be it known that I, JULES P. METZGER, a citizen of the United States, and a resident of Carlstadt, in the county of Bergen and State of New Jersey, have invented a new and Improved Combined Pressure Regulating and Governing Apparatus, of which the following is a full, clear, and exact description.

The invention relates to pressure regulators such as shown and described in the Letters Patent of the United States, No. 1,244,226 and No. 1,308,638, granted to me on October 23, 1917, and July 1, 1919, respectively.

The object of the present invention is to provide a new and improved combined pressure regulating and governing apparatus arranged to insure the accurate functioning of the apparatus as a regulator, and after it has been set to a predetermined pressure, and to provide a governing function for coördinating or sub-controlling the regulator without interfering with the accuracy therein in the performance of its work as a regulator.

Another object is to render the pressure regulating and governing apparatus exceedingly sensitive and dispensing entirely with packings, glands, stuffing boxes and other devices producing frictional resistance.

Another object is to permit of adjusting the governing device wholly independently of the regulating device.

Another object is to permit the regulating device to function wholly independently of the governing device in case of repairs or the like.

Another object is to provide a regulating and governing apparatus which is simple and durable in construction, easy of inspection and not liable to get easily out of order.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side view of the combined pressure regulating and governing apparatus as applied to the header of a battery of boilers feeding into a plurality of receivers intended to carry a constant pressure much lower than the boiler pressure;

Fig. 2 is a plan view of the same;

Fig. 3 is an enlarged sectional side elevation of the improved combined pressure regulating and governing apparatus;

Fig. 4 is a similar view of a modified form of the same; and

Fig. 5 is a similar view of another modified form of the same.

The combined pressure regulating and governing apparatus presently to be described in detail relates to a general class of pressure regulators and governing devices in which the fluid delivered is at a predetermined pressure and the devices are intended for use in various developments of steam engineering service, and the improved apparatus applies wherever fluid pressure is to be delivered and governed. The apparatus is capable to be used in power plants, marine and naval engineering, also, in many cases, in industrial plants of various natures wherever steam is used to operate air compressors, pumps, etc., or for heating boiling apparatus such as steam vats, vacuum pans, etc. The improved apparatus is capable to be used, in some instances, for several purposes. It is intended as an automatic device but may be rendered semi-automatic only, or hand operated, should conditions require it. The apparatus may be reduced or reverted to perform solely the functions of an automatic pressure regulator. By this connection the fluid pressure chamber, which sub-controls and coördinates with the pressure regulator proper and the regulator, may be shut off even manually without tampering with its predetermined setting of pressure.

The body 10 of the pressure regulator 11 is provided at one side with an inlet 12 and at the other side with an outlet 13, of which the inlet 12 is connected by a pipe 14 and valved branch pipes 15 with boilers 16 or other source of motive agent supply. The outlet 13 is connected by a pipe 17 and valved branch pipes 18 with receivers 19 to be supplied with steam under a lower pressure than that of the boilers 16. A valve seat 20 within the body 10 connects the inlet 12 with the outlet 13, and this valve seat 20 is controlled by a valve 21 normally held to its seat by a light spring 22. The upper end of the stem 23 of the valve 21 is connected with the stem 24 of a piston 25 mounted to reciprocate in a cylinder 26 formed within the body 10 and separated from the outlet by a horizontal partition 27 having openings or ports 28 to connect the lower end of the cylinder 26 with the outlet 13. The upper end of the cylinder 26 is closed by a cap 30 provided at the under side with a recess 31 connected by one or more ports 32 with a chamber 33 arranged in the cap 30. The chamber 33 is provided at the under side with a valve seat 34 opening into an expansion chamber 35 formed in the cap 30 and connected by a port 36 with the inlet 12 of the valve body 10. The valve seat 34 is normally closed by a controlling valve 40 extending within the expansion chamber 35 and pressed to its seat by a spring 41 seated on the top of a screw plug 42 screwing in the bottom of the expansion chamber 35. The upwardly extending stem 43 of the controlling valve 40 is engaged at its upper end by a diaphragm 50 held in a diaphragm chamber 51 arranged in the top of the cap 30 and connected by a port or opening 52 with the outlet 13 of the body 10. The diaphragm 50 is fastened in position by a nipple 53 screwed or otherwise secured to the top of the cap 30. The top of the diaphragm 50 is normally pressed on by the lower enlarged end 55 of a rod or stem 56 extending centrally in the nipple 53 and passing through a cap 57 screwed or otherwise secured to the nipple 53. On the lower end or head 55 of the rod or stem 56 rests the lower end of a spring 58 extending within the nipple 53 and engaging a seat 59 swiveled on the under side of the cap 57. By screwing the cap 57 down or up on the nipple 53 the tension of the spring 58 can be regulated, and after the desired adjustment is made the cap 57 can be locked and sealed by a suitable locking and sealing device, if it is desired to do so. It is understood that by the arrangement described a set spring device is provided whereby the diaphragm 50 is alive, lively and resilient at all times. The construction thus far described is practically the same as the one shown and described in the Letters Patent of the United States No. 1,308,638, above referred to, and hence the construction involves no new feature.

The rod or stem 56 projects a distance above the top of the cap 57 and is connected with a governing device 60 arranged as follows: The upper end of the rod or stem 56 is connected with one end of an equalizing lever 61 fulcrumed at 62 on a bracket 63 attached to a sidewise extension 64 forming part of the cap 30. The other end of the equalizing lever 61 is pivotally connected with the upper end of a rod or stem 65 resting with its lower enlarged end 66 on the top of a diaphragm 67 extending over the top of a fluid chamber 68 formed in a body 69 forming part of or supported by the extension 64 of the cap 30. The fluid chamber 68 is connected with a pipe 70 and valved branch pipes 71 with the several receivers 19. In the particular use of the apparatus as shown in Figs. 1 and 2, the fluid chamber 68 is connected by a pipe 70 and valved branch pipes 71 with the vacuum chambers of the several receivers 19, it being understood that the vacuums in the said several receivers are controlled by a vacuum pump 72 driven by steam delivered from the pipe 17 to the vacuum pump 72 by a valved branch pipe 73. The vacuum pump 72 is connected by valved branch pipes 74 with the vacuum chambers of the receivers 19, as plainly shown in Figs. 1 and 2.

Within the chamber 68 is arranged a central stop 75 for the middle portion of the diaphragm 67 to rest on when moved into lowermost position. The marginal portion of the diaphragm 67 normally rests on a seat 76 formed by an annular flange extending integrally with the body 69 and arranged at the top of the chamber 68. The diaphragm 67 is held in place on the seat 76 by a cap 80 through which the rod or stem 65 extends, and this cap 80 is provided on top with a stop flange 81 adapted to be engaged by the top of the enlarged end 66 of the rod or stem 65, to limit the upward movement of the rod and that of the diaphragm 67. The rod or stem 65 is preferably made in upper and lower sections 85, 86 connected with each other by a turnbuckle 87 to permit of lengthening or shortening the rod or stem 65.

When the pressure regulating and governing apparatus is in use then steam passes from the boilers 16 by way of the branch pipes 15 and the inlet pipe 14 through the pressure regulator 11 and by way of the discharge pipe 17 and branch pipes 18 into the receivers 19. The regulator 11 is first set at the predetermined measure required (by recording on a suitable gage) and then locked, if desired, after which the rod or stem 65 is adjusted by means of the turnbuckle 87 so that the end 66 presses the diaphragm 67 onto the stop 75. When the diaphragm 67 is in this position then equalization is had by way of the rod or stem 65 and the equalizing lever 61 connected with the rod or stem 56 controlled by the diaphragm 50. It is understood that the upper face of the diaphragm 67 is under the influence of atmospheric pressure while the under side of the diaphragm 67 is under the influence of the pressure of the vacuum in the receiver 19. Now in case the vacuum should break in any one of the receivers 19 then the pressure in the chamber 68 increases thus lifting the diaphragm 67 and thereby causing an upward swinging movement of the right hand end of the lever 61 by the connected rod or stem 65 and a downward movement of the left hand end of the lever 61 and the rod or stem 56 whereby the regulator 11 is actuated and more steam is allowed to pass through the regulator from the boiler to the vacuum pump with a view to restore the vacuum in the receivers 19. It will be noticed that in this particular arrangement the regulator acts as a vacuum restoring valve. The diaphragm 67 in the chamber 68 has, preferably, a larger seating area, the exposed part to receive pressure when normal being smaller than the upper side exposed to the atmosphere, but when the vacuum is broken and the pressure in the chamber 68 increases as above described and the diaphragm 67 is lifted then the diaphragm is gradually exposed to a larger area and its lifting power is accelerated. By this arrangement the action of the apparatus is intensified until the equilibrium and, therefore, the proper vacuum is established. It is evident that all the features of the proper and most sensitive apparatus are retained in the regulator, and the improvement is without packing, glands or stuffing boxes or other frictional resistances and is hence exceedingly sensitive and practically perfect in operation. Should for any cause a slight variation on the vacuum side be necessary then adjustment can be made by the turnbuckle 87 without requiring readjustment of the regulator 11. Thus the regulator 11 can keep on functioning irrespective of the action of the receiver in case of repairs or the like.

In the modified form shown in Fig. 4, the regulator 11 is the same as above described, and the upper end of the rod or stem 56 is pivotally connected with an equalizing lever 90 intermediate the ends thereof. One end of the equalizing lever is fulcrumed on a bracket 91 attached to the cap 30, and the other end of the equalizing lever is provided with a pivot pin 92 engaging a slot 93 formed in the upper end of an adjustable rod or stem 94 having its lower enlarged end 95 resting on top of a diaphragm 96 held in a fluid chamber 97 attached to or formed on the cap 30. It will be noticed that in this case the rod or stem 94 can be lengthened or shortened the same as above described relative to the rod or stem 56, but in addition a lagging means is provided by the slot 93 and engaging the pivot 92. An adjustable stop 100 is provided to limit the upward movement of the rod or stem 94 and the diaphragm 96 to exactly predetermine the movement of the rod or stem 94. The stop 100 is preferably in the form of a screw rod screwing in the cap 101 of the chamber 97. It will be noticed that in this case the lifting of the diaphragm 96 is exactly predetermined to respond to the variable conditions of pressure desired in coordination with the said pressure regulator 11.

When using the apparatus as a pump regulator, the stop 110 for the diaphragm 96 is in the form of a screw plug and is connected by a pipe 111 with the water chamber of the pump so that water passes into the chamber 97 by way of the pipe 111 and ports 112 formed in the upper end of the plug 110 and discharging the water into the chamber 97 uniformly and in a downward direction to prevent direct impulse of the fluid against the under side of the diaphragm 96. It will be noticed that the plug 110 can be readily unscrewed to permit of inspecting the same. A valved pipe 115 leading from an oil supply is preferably connected with the chamber 97 to admit oil on top of the water in the chamber with a view of cushioning the diaphragm 96. It often happens in practice that the regulator 11 is made to feed various pumps and in some cases is made to work intermittently. This working causes vibration and the water produces a ramming action when one or more of the pumps are shut off or put back into service. It is evident that the most exact device is necessary in such cases and the regulator is required to work very close to the predetermined pressure of steam at which it is set or otherwise the results above referred to, will be aggravated and become very serious. With the improvement described the adjustment will prevent any of the variations to sensibly affect the regulator owing to the proper amount of variable lag movement which is provided by the connection of the rod or stem 94 with the equalizing lever besides the adjustment of the rod or stem itself.

In the modified form shown in Fig. 5 the regulator 11 is practically of the same construction as above described in reference to the regulator illustrated in Figs. 3 and 4, and the governing device 60 is arranged as follows: The chamber 120 is provided with a plug 121 similar to the plug 110, connected by a pipe 122 with a pressure supply such as steam, air or other fluid. The diaphragm 123 is engaged at the top by the lower end 124 of a rod or stem 125 connected with one end of an equalizing lever 126 fulcrumed at its other end on a bracket 127 attached to the cap 30 of the regulator 11. The equalizing lever 126 is connected intermediate its ends with the upper end of the rod or stem 56 of the pressure regulator 11. The top of the enlarged end 124 of the rod or stem 125 is engaged by a spring 130 abutting with its upper end on the seat 131 swiveled on the under side of a cap 132 screwing on a cap 133 screwed or otherwise secured to the body 134 of the governing device 60. It will be noticed that by the arrangement described an adjustable spring pressure device is provided for the top of the diaphragm 123 and which is wholly independent of the adjustable spring pressure device for the rod or stem 56 of the regulator 11. Thus the governing device may be set to any predetermined pressure and locked in the same if desired.

It is understood that I do not limit myself to the particular use of the regulating and governing apparatus as shown and described as the apparatus is applicable as a most efficient fluid or air governing device of any kind.

It is also evident that it may be applied, for instance, for setting the predetermined pressure of any receiver of steam, air or fluid, setting first the fluid chamber at a pressure carried in the receiver, and the regulator in accordance with the same will supply the fluid of the pressure to the receiver and maintain same, irrespective of outlet pressure at throat of regulator. This in many cases is important where, for instance, receiver or fluid chamber connecting is located far from the regulator. It will take, in this way, care of drop of pressure due to long line of pipe. It is evident that in this connection neither the springs nor the diaphragm need to be the same size in each fluid pressure chamber. In an apparatus of this kind it is necessary that every means possible be taken to prevent them from getting out of order, and therefore must be simple of construction, must be capable of easy inspection, and they must, above all, be sensitive and as responsive to any change of working conditions as it is possible to make a device.

This is of paramount importance when the result is considered, not only to property but even to life, should an apparatus of this kind fail to work when depended upon. Engines, pumps and receivers of the largest power plants might be destroyed. While this device is usable with low pressures it is identified and intended to apply to high pressures and in many cases very large receivers and, therefore, the importance of my application, in view of the facts stated above, is readily seen, as no stuffing box of any kind, either under steam or any other fluid connection is used to reduce the sensitiveness of the apparatus, allowing an absolute free movement of the parts. It is as sensitive as a scale, as all parts governing impulse are in equalization.

The important condition of the principle of this improvement is that the two diaphragms, although acting and coördinating together to accomplish the functions required, are not rigidly connected, but located side by side, each one is independent in its movement therefore flexible and resilient, made of different material, if necessary.

In setting the adjusting device whatever difference may be in their resiliency, due to the causes referred to being connected through resilient spring members, the highest flexibility that can be produced is obtained, the coördination of all the parts making this possible, and, therefore, a most sensitive device is made, suitable to most conditions met in service.

It is evident that by the arrangement shown and described, a combined regulating and governing apparatus is provided comprising a fluid pressure regulator which controls a fluid under pressure, and a governing device which is controlled by another fluid, but the latter is resultant from the activity of the regulator controlled fluid.

Having thus described my invention, I claim as new and desire to secure by Letters Patent:—

1. A combined regulating and governing apparatus, comprising a pressure regulator set to a predetermined pressure and controlling a fluid under pressure, and a governing device mechanically connected with the said pressure regulator and controlled by another fluid under pressure.

2. A combined regulating and governing apparatus, comprising a pressure regulator and a governing device mechanically connected with the same, the said pressure regulator controlling a fluid under pressure and the said governing device being controlled by another fluid, the pressure of which is resultant from the action of the said regulator fluid.

3. A combined regulating and governing apparatus, comprising a pressure regulator controlling a fluid under pressure and provided with means for adjustably setting the regulator to a predetermined pressure, a governing device controlled by another fluid, and an equalizing lever connecting the said governing device with the said adjustable regulator means.

4. A combined regulating and governing apparatus, comprising a pressure regulator controlling a fluid under pressure and provided with means for adjustably setting the regulator to a predetermined pressure, a governing device controlled by another fluid; an equalizing lever connected with the said adjustable regulator means, and an adjustable connection between the said equalizing lever and the said governing device.

5. In a fluid pressure regulating and governing device, a pressure regulator controlling fluid under pressure, an adjacent fluid chamber closed by a diaphragm, fluid connection to said chamber, receiving fluid pressure from another source of supply and mechanical means of using said fluid pressure to sub-control pressure regulator supply.

6. A pressure regulating and governing device, consisting of a pressure regulator controlling fluid under predetermined pressure, a separate fluid chamber closed by a diaphragm and receiving fluid under pressure from another source of supply, mechanical connecting means between said regulator and fluid chamber, said means capable of modifying the control of said pressure regulator.

7. In a fluid pressure regulating device controlled by a diaphragm, a second inclosed diaphragm, fluid under pressure under said second diaphragm, adjustable mechanical means above said second diaphragm, and connecting mechanical means between said adjustable means and the said pressure regulating device, said diaphragms being located side by side.

8. In a pressure regulating device, having a valve controlled by a diaphragm with an adjustable spring device above said diaphragm, a separate fluid chamber containing another diaphragm, fluid pressure acting under said diaphragm, and connecting equalizing means fulcrumed between the said diaphragms, the diaphragms being located side by side.

9. In a pressure regulating and governing device, a pressure regulator containing a diaphragm, a casing containing a resilient member, means of acting upon said member by an adjusting cap on said casing, a rod contacting the diaphragm and also supporting said resilient member, another diaphragm located adjacently in same plane to the other, a casing above said diaphragm, an adjustable rod partly contained in said casing and contacting the diaphragm, and an equalizing lever connecting the two contacting rods, the two diaphragms covering a fluid chamber, and being acted upon by a fluid pressure under same.

JULES P. METZGER.